Nov. 22, 1949

S. W. LASTO 2,489,239

MACHINE

Filed March 15, 1945

INVENTOR.
Stephen W. Lasto
BY
John F. Hanrahan
ATTORNEY

Nov. 22, 1949 S. W. LASTO 2,489,239
MACHINE
Filed March 15, 1945 9 Sheets-Sheet 4

INVENTOR.
Stephen W. Lasto
BY
John J. Hanrahan
ATTORNEY

Fig. 6

Nov. 22, 1949 S. W. LASTO 2,489,239
MACHINE
Filed March 15, 1945 9 Sheets-Sheet 6

INVENTOR.
Stephen W. Lasto
BY
ATTORNEY

Nov. 22, 1949 S. W. LASTO 2,489,239
MACHINE
Filed March 15, 1945 9 Sheets-Sheet 7

INVENTOR.
Stephen W. Lasto
BY

ATTORNEY

Nov. 22, 1949   S. W. LASTO   2,489,239
MACHINE
Filed March 15, 1945   9 Sheets-Sheet 8

INVENTOR.
Stephen W. Lasto
BY
John F. Hanrahan
ATTORNEY

Nov. 22, 1949  S. W. LASTO  2,489,239
MACHINE

Filed March 15, 1945  9 Sheets-Sheet 9

INVENTOR.
STEPHEN W. LASTO
BY
John P. Hanrahan
ATTORNEY

Patented Nov. 22, 1949

2,489,239

UNITED STATES PATENT OFFICE 2,489,239

MACHINE

Stephen W. Lasto, Stratford, Conn., assignor of one-half to Fred E. Lacey, Bridgeport, Conn.

Application March 15, 1945, Serial No. 582,984

16 Claims. (Cl. 90—15)

This invention relates to new and useful improvements in machine tools.

The objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Referring in detail to the drawings, the machine includes a base comprising a hollow casting generally designated 10, and comprising a bottom wall 11, a top wall 12, side walls 13 and 14, and rear and front walls 15 and 16. An extension 17 on the upper middle portion of the front of the base provides a mounting for a work support later to be more fully described.

Figures 1, 18:
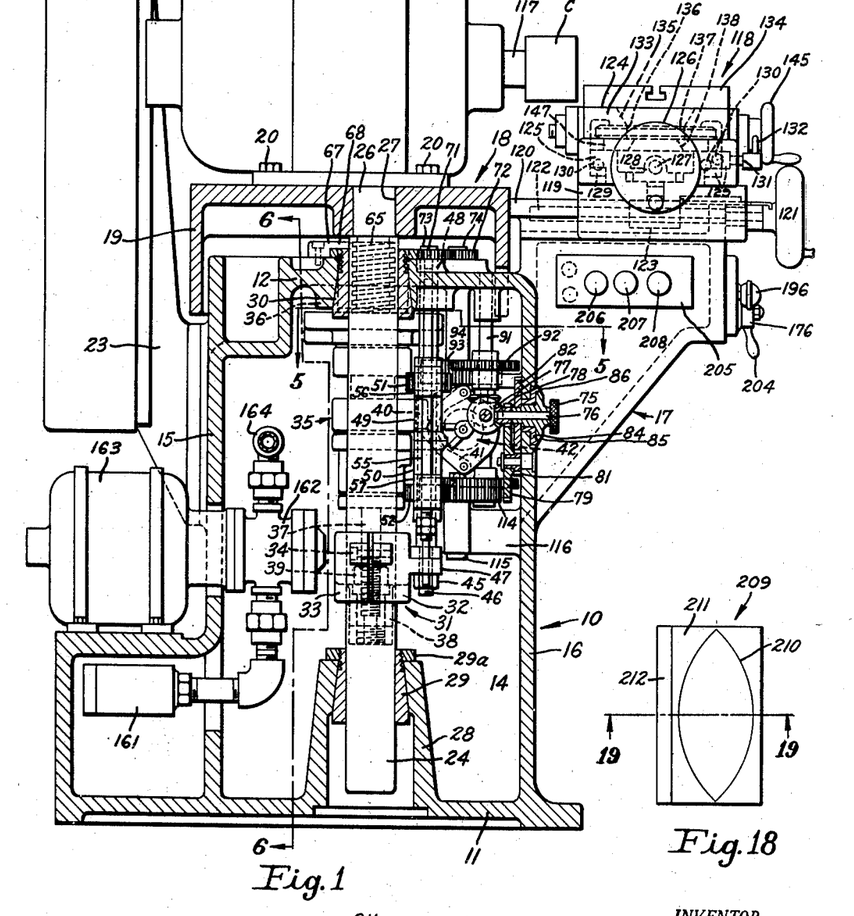
Fig. 1 is a view partly in side elevation and partly in vertical section of the machine of the invention, the view being taken as along the line 1—1 of Fig. 3.
Fig. 18 is a plan view of a piece of work.
Figure 2:
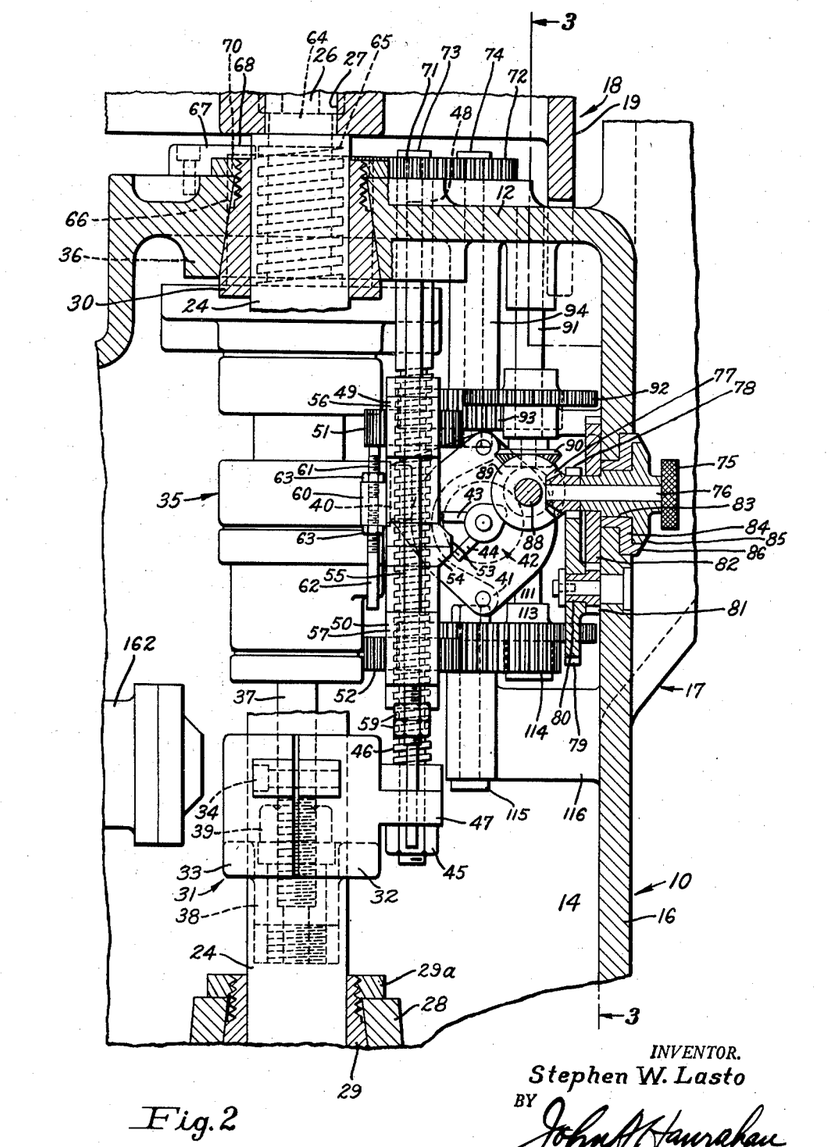
Fig. 2 is a sectional view on an enlarged scale showing the gearing and rotary pilot valve and associated parts of Fig. 1, the view being taken as along the line 2—2 of Fig. 3.
Figure 3:
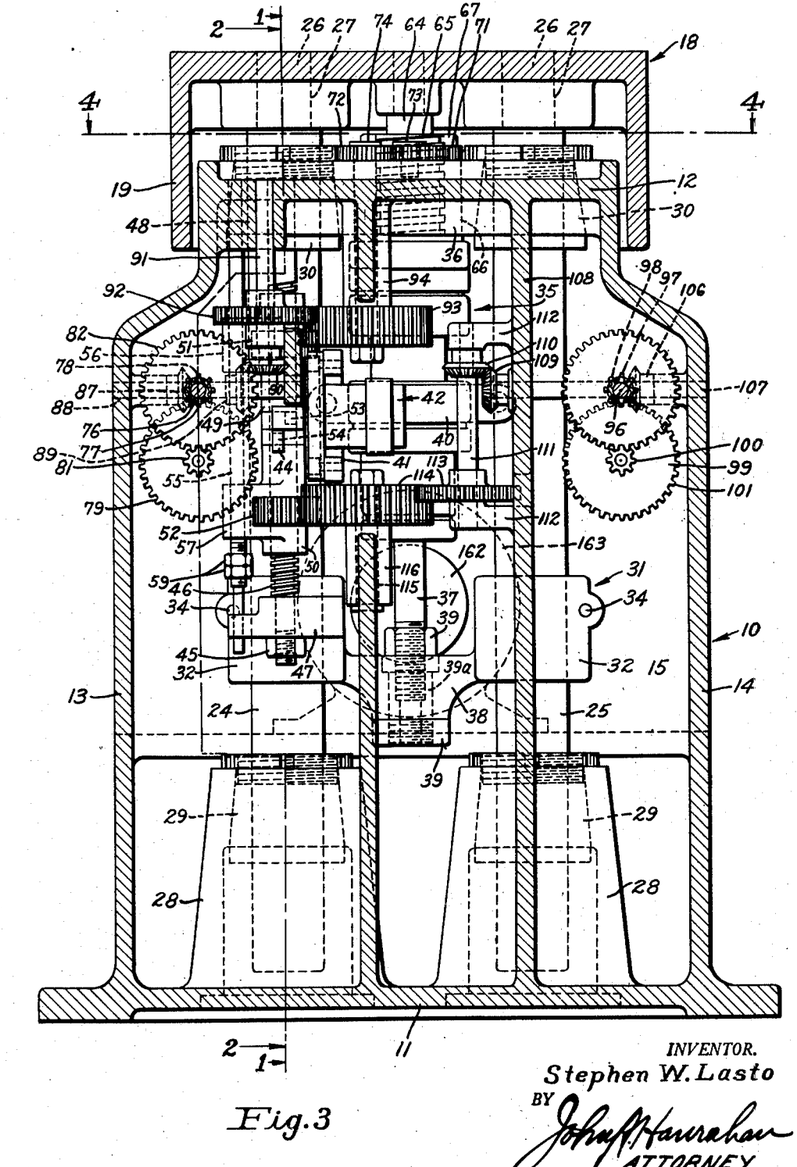
Fig. 3 is an enlarged sectional view taken immediately inside the front wall of the base as along the line 3—3 of Fig. 2.
Figure 4:
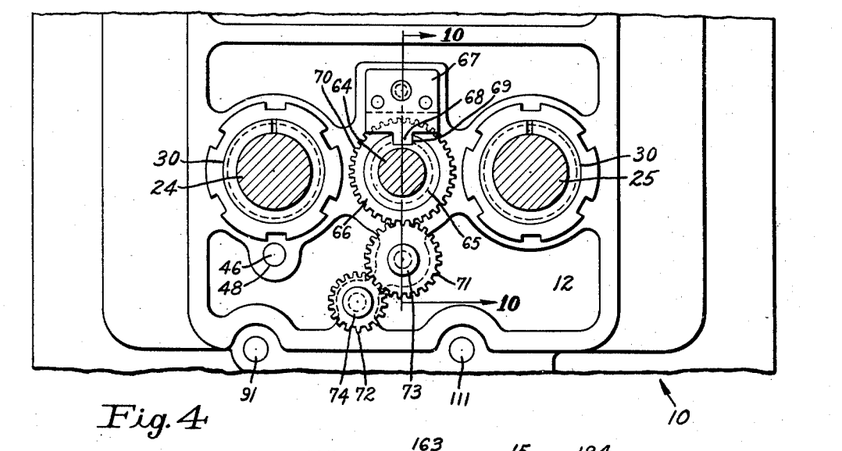
Fig. 4 is the sectional view taken along the plane of line 4—4 of Fig. 3.
Figure 5:
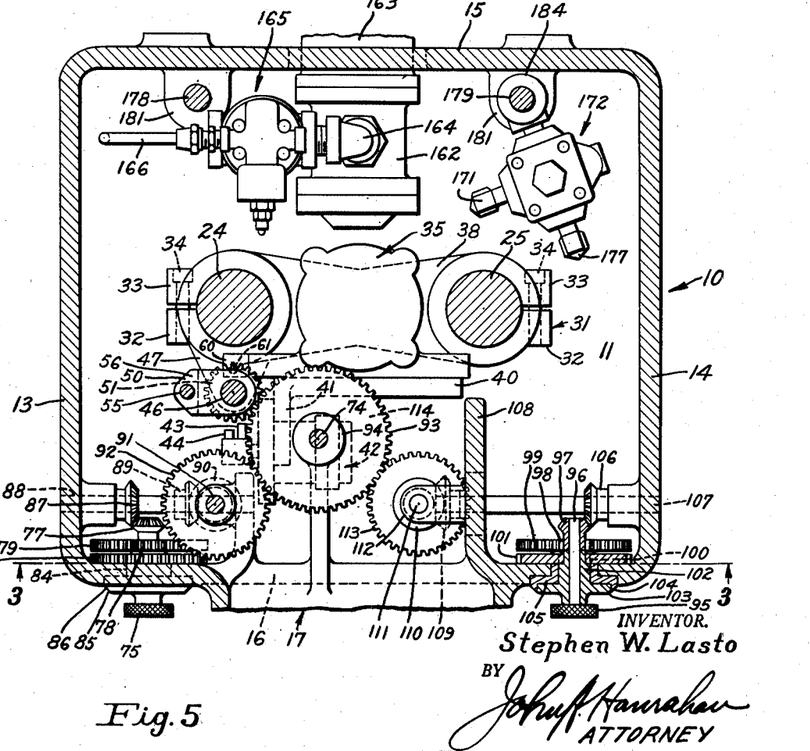
Fig. 5 is a sectional view taken as along the plane of the line 5—5 of Fig. 1.

At the upper side of the base 10 is a platen, generally designated 18, and comprising a hollow casting open at its lower side. As illustrated in Figs. 1 and 3 a skirt portion 19 of the platen is adapted to have a limited telescopic relation with the upper portion of base 10 when the platen is in its lower position. Secured by bolts 20, or otherwise made fast to the upper side of the platen 18, is an electric motor 21, the speed of which is variable and controlled by electronic means indicated by 22. This electronic control means is conventional and therefore is only indicated and is not illustrated. It may be supported as on the bracket 23 extending from the rear wall 15 to the base.

A pair of posts 24 and 25 are located for the most part within the base 10, but pass through the top wall 12 of the latter and each includes a reduced diameter upper portion 26. Such portions 26 wedge in sockets 27 in the platen 18 or in any other suitable manner are rigidly and securely connected with the platen. Similar hollow bosses 28 are formed or cast with the base wall 11 and extend inwardly therefrom and each boss receives a tapered split bushing 29. Similar split tapered bushings 30 are mounted in openings in the top wall 12 of the casting. The upper and lower split bushings are aligned in pairs and slideably receive the posts 24 and 25. These bushings are adjustable to compensate for wear and may be adjusted by tightening the nuts 29A.

A crosshead generally designated 31 connects the posts 24 and 25 at a point above their lower ends and includes at its outer ends split portions 32 and 33 clamped about the respective posts 24 and 25 by bolts 34. Cylinder 35 of a piston and cylinder assembly is secured in any suitable manner to a pad 36 formed at the underside of the top wall 12 of the base and the piston rod 37 of such piston and cylinder assembly is secured to the intermediate portion 38 of the crosshead 31 as by nuts 39. These nuts lock the piston rod to the crosshead and also lock in the latter a bushing 39A in which the lower end of the rod is threaded.

The invention includes means (later to be described) for supplying fluid under pressure to the cylinder 35 to raise and lower the piston (not shown) and since the piston rod is connected with the crosshead 31 and the latter is clamped to the posts 24 and 25 it will be understood that the hydraulic means provides for the raising and lowering of said posts as a unit. Clearly as these posts are raised and lowered the platen 18 and the motor 21 thereon will be given similar movement.

Bracket 40 fixed to the cylinder 35 includes arms 41 at one side of the cylinder and such arms provide a mounting for a rotary pilot valve 42. Valve 42 includes spaced fingers 43 and 44 located in planes slightly offset laterally from one another. A nut 45 clamps the lower end portion of a screw 46 to an extension or lug 47 on the crosshead portion 32 and this screw extends vertically and its upper end is supported as at 48. As will later be more fully appreciated the screw 46 is held against all turning movement about its own axis.

Mounted on the screw 46 are upper and lower dogs 49 and 50, respectively, and these dogs are freely slidable on the screw but respectively mount gears 51 and 52 which are actually threaded to the screw. Thus it will be seen that the dogs may be adjusted or moved vertically along the screw only by turning of the respective gears. The dogs 49 and 50 include projections or foot portions 53 and 54, respectively, and such foot portions are laterally displaced relatively so that they align with the valve operating fingers 43 and 44, respectively.

A vertically disposed tie-rod 55 passes through extension portions 56 and 57 of the dogs 49 and 50, respectively, and toward its upper end is of enlarged diameter providing a shoulder 58 whereby vertical adjustment upwardly of the dog 49 relative to dog 50 is limited. Towards its lower portion rod 55 is threaded and equipped with nuts 59 providing adjustable stops for positively limiting any downward adjustment of the dog 50 relative to the dog 49.

In addition to serving as limiting means controlling adjustment of the dogs 49 and 50 the tie-rod 55 passes through the dogs in eccentric relation with screw 46 preventing swinging movement of the dogs about the screw as an axis. A part 60 of the bracket 40 adjustably mounts rods 61 and 62 disposed vertically. Lock nuts 63 are provided to secure these rods in adjusted positions and such rods are so disposed that the upper end of rod 61 is located below gear 51 and the lower end of rod 62 is located above gear 52.

Thus these rods serve to prevent excessive adjustments of the gears 51 and 52 and therefore the dogs 49 and 50 toward one another along the screw 46. The purpose of these devices for limiting adjustments will later appear. It will be understood that the screw 46 and the dogs 49 and 50 move vertically up and down with the posts 24 and 25 and that the positions of the dogs with respect to the screw determine the times at which the foot pieces 53 and 54 of the dogs will engage the fingers 43 and 44 of the rotary pilot valve 42 and thus the length of the stroke imparted to the motor 21.

At its underside the platen 18 carries a short pin 64 in vertical alignment with an adjustable stop screw 65 threaded in a cylinder or sleeve 66 mounted in the upper wall 12 of base 10. A bracket 67 is fixed to the outer side of such wall and includes a finger-like portion 68 overlying the upper end of the sleeve 66 and holding the latter against vertical movement. The finger 68 also extends into a keyway 69 in the screw 65 and while it does not prevent vertical movement of the screw it does prevent turning of screw with the sleeve and thus insures that when the sleeve is turned the screw is fed inwardly or outwardly of the sleeve, depending on the direction in which the latter is rotated.

About its upper end sleeve 66 is provided with gear teeth whereby such upper end comprises a gear 70 and the latter meshes with a gear 71 in turn meshing with a gear 72. Gears 71 and 72 are mounted on shafts 73 and 74 journaled in the wall 12 of the base. The shaft 74 is turned when making any adjustment of the dog 49 and thus the stop screw 64 is always maintained in a predetermined relation with such dog which operates the valve 42 at the end of the down stroke of the platen 18.

The means for adjusting the dog 49 and the stop screw 65 comprises a hand or finger knob 75 fixed to a shaft 76 passing through the front wall 16 of the base at one side of the extension 17 of the latter. A means comprising a bevelled gear 77 and a small pinion gear 78 is fixed to the inner end of shaft 76 and such small pinion gear meshes with a large diameter gear 79 fixed with relation to the hub 80 of a small pinion gear 81 meshing with a large diameter gear 82 fixed on hub 83 journaled in a bushing 84 carried by the wall 16.

Hub 83 includes an outer portion comprising a disc 85 and suitable vernier markings on the face of said disc are adapted to be read in conjunction with suitable markings on the exposed ring-like face 86 of the bushing 84. With the described gearing it will be clear that a very substantial turning of the knob 75 will result in but a small turning movement of the vernier marked plate or face portion 85 of the hub 83 with relation to the marking or markings on the ring-like face 86.

Bevelled gear 77 meshes with a similar bevelled gear 87 fixed on a horizontal shaft 88 and carrying a bevelled gear 89 meshing with a bevelled gear 90 on a vertical shaft 91. Fixed to shaft 91 is a relatively large gear 92 meshing with a gear 93 which has a relatively large diameter and which as clearly shown in Figs. 1 and 3 is of considerable width. Gear 93 is fixed to the lower end portion of shaft 74 and above such gear said shaft may be disposed in a sleeve 94 as shown as cast with the base 10. Since gear 93 is fixed to the shaft 74 and the latter carries the gear 72 it will been that on any turning of the knob or hand piece 75 the sleeve 66 will be turned and will feed the stop screw 65 upwardly or downwardly depending upon the direction in which such hand knob is turned.

Gear 93 also meshes with the gear 51 of the dog 49 and therefore it will be seen that on turning of the knob 75 the gear 51 will be turned and will be fed in one direction or the other along the screw 46 and will carry the dog 49 with it. Thus turning of knob 75 adjusts the timing of the machine and controls the length of its stroke by varying the position of the dog 49 on screw 46 and the time at which the foot 53 of the dog will engage the finger 43 of valve 42. As the turning of the knob 75 results in turning of sleeve 66 the limiting or stop screw 65 is adjusted to correspond with any adjustment of dog 49 along screw 46.

A means similar to that above described is used in effecting adjustments of the dog 50 along the screw 46. Such means includes a hand piece or knob 95 arranged at the front of the machine and at the side of the base extension 17 opposite that of which the knob 75 is located. Knob 95 is fixed to a shaft 96 passing through the front wall 16 of the base 10 and at its inner end fixed to and carrying a bevelled gear 97 and a small gear 98 which latter meshes with a relative large diameter gear 99 on a shaft with and fixed to a small diameter gear 100 in turn meshing with a large diameter gear 101 fixed to a hub portion 102 which corresponds with a hub portion 83 and is provided with a front plate or disc 103 carrying vernier markings for reading with the marking on the ring-like face 104 of a bushing 105 mounted in wall 16 and providing a bearing for hub portion 102. Clearly with the gearing described the knob 95 may be given a number of revolutions without turning of the vernier face through more than a portion of a revolution.

Bevelled gear 97 meshes with a bevelled gear 106 fixed to a horizontal shaft 107 which at the inner side of the wall or bracket 108 carries a bevelled gear 109 meshing with a bevelled gear 110 fixed to a vertical shaft 111. Shaft 111 is mounted between brackets 112 on the wall 108 and toward its lower end has a gear 113 fixed thereto and meshing with a gear 114 on a shaft 115 mounted in a bracket 116 cast with the base wall 16. Gear 114 is a relatively large diameter and is quite thick and in fact is a duplicate of the gear 93 above described.

The gear 52 within the dog 50 meshes with gear 114. From this it will be understood that on turning of the knob 95 the gear 52 is turned about the fixed screw 46 and feeds the dog 50 upwardly or downwardly along such screws, the direction of movement of the dog depending on the direction of movement of the knob 95. The movements of the dogs 49 and 50 by turning of the gears 51 and 52 will take place since as previously set forth such gears have threaded engagement with the screw 46 and the latter is not rotatable.

In the present machine the shaft 117 of the motor 21 is to be equipped with a suitable chuck C adapted to hold and rotate in a horizontal position a suitable tool as a tool similar to an end mill. Thus such a tool would be disposed over a workholder generally designated 118 and mounted on the upper side of the base extension 17. As herein disclosed the workholder 118 comprises a slide 119 mounted on a way 120 and adapted to be moved there along toward and from the motor on the turning of the hand wheel 121 fixed to a screw 122 threaded into a lug 123 depending from the slide.

On slide 119 is a cross slide 124 adjustable on a way 125 by the turning of the hand wheel 126 fixed to a screw 127 threaded into a lug 128. The various ways are equipped with gibs 129 adapted to be adjusted or taken up by the screws 130. A screw 131 is adapted to be adjusted as by hand piece 132 so as to bind against the way on which the slide 124 is adjustable.

Intermediate its ends slide 124 on its upper side is provided with a hollow built-up portion 133 supporting a work plate 134 including a depending stem-like portion entering said hollow part 133. Such a stem-like portion includes a bevelled surface portion 135 bearing against a similar portion of the part 133, a straight portion 136 having a worm gear 137 secured thereto, and below such worm a portion 138 bevelled reversely with respect to the bevelled portion 135.

The engaged surface at 135 provides for turning movement of the work plate 134 on slide 124. Meshing with the worm gear 137 fixed to the stem-like portion of said work plate is a worm 138 fixed on a shaft 139. Such shaft is received in an extension 140 of the portion or housing 133 and towards its respective ends the shaft is mounted in an eccentric bushing 141. Said bushing is provided with a pair of oppositely disposed notches 142 and 143 and associated with said bushing is a spring pressed locking plunger 144.

The arrangement is such that on withdrawing of the plunger the bushing may be rotated through 180 degrees so that the plunger being withdrawn from notch 143 bushing 141 may be turned to have the plunger enter notch 142. These parts are so disposed that when the plunger is in notch 143 shaft 139 is so related to the worm gear 137 that worm 138 is meshing with such worm gear. Therefore on rotation of the shaft 139 as by a hand wheel 145 gear 137 will be rotated and being fixed to the stem-like portion of the workplate 134 the latter will be rotated about a vertical axis. By rotating the bushing 141 through 180 degrees the spring plunger is engaged with notch 142 at which time shaft 139 is so located that the worm 138 is out of mesh with the worm gear 137.

From the above it will be seen that with the structure thus far described the work plate 134 may be adjusted toward and from the motor 21 by manipulation of the hand wheel 121 and it may be adjusted transversely with respect to the motor by manipulation with the hand wheel 126 and it may be adjusted about a vertical axis by turning of the hand wheel 145. Means are provided for locking the work holder in any radially adjusted position and while such means may take any desired form one means is herein specifically disclosed.

Disposed immediately below the worm wheel 137 are a pair of lock plates 146 and 147 each having an arcuate notch in its inner edge and such plates are disposed at opposite sides of the tapered portion 138 of work plate 134 with their notches at all times substantially receiving such tapered portion. The edges of the arcuate notched portions of plates 146 and 147 are tapered complementary to the taper of pin portion 138 of the work holding plate.

A pair of screws 148 and 149 passing through the side walls of the slide 124 engage the outer sides of lugs 150 and 151 formed with the plates 146 and 147. Somewhat similarly screws 152 and 153 engage shoulders 154 and 155 on the plates 146 and 147 respectively at the sides of the arcuate notches opposite those of which the lugs 150 and 151 are located. Between the shoulders 154 and 155 plates 146 and 147 are provided with extensions 156 and 157 respectively and through which pass a rod 158 carrying a nut 159 bearing against the outer side of lug 156. On the rod 158 at the outer end of the slide 124 is manipulation means 160.

In the use of the device the screws 148, 147, 152 and 153 are adjusted into positions so that when they are engaging the lugs and shoulders of the plates 146 and 147 such plates clear the portion 138 of the stem-like means so that the work holder plate 134 may be given rotary adjustment on the side 124. At such times the plates 146 and 147 are just clearing the said stem-like portion and therefore only a slight manipulation of the means 160 is required to draw the extensions 156 and 157 of such plates toward one another whereupon the screws 148 and 149 preventing separation of the lugs 150 and 151 the plate shoulders 154 and 155 are moved slightly inwardly from the screws 152 and 153. When this occurs the plates are caused to tightly embrace the tapered portion 138 of the stem-like portion of the work supporting plate and they have a tendency to cam such pin inwardly and draw surface portion 135 tightly against its seat whereby the work supporting plate is centered and is very tightly locked in any desired position of radial adjustment.

The entire lower portion of the base 10 comprises an oil sump and through a strainer or screen 161 a pump 162 takes the oil or other hydraulic fluid and distributes it under pressure as will be described. Pump 162 may be driven by an electric motor 163. Through suitable fittings 164 pump 162 discharges into a pressure relief valve 165. This valve is connected by pipe or tube 166 with a four-way valve of the pilot operated type 167.

Pipes 168 and 169 from a pair of the ports of valve 167 connect with a pair of ports of an adjustable time delay valve 170, while a pipe 171 connects a third port of the valve 167 with a counterbalance valve 172. A pipe 173 connects a port of valve 165 with the rotary pilot valve 42 and such valve is also connected by suitable pipe 174 with a port of the valve 170. A pipe 175 from valve 167 is connected with a valve 176 (shown only in the diagram of Figs. 1 and 9). A pipe 177 connects a port of the counterbalance valve 172 with the lower end of the cylinder 35. This connection is shown only in diagrammatic Fig. 9. The operation of the various valves so far mentioned together with the pipe arrangement between these valves and a valve yet to be described will be given in connection with Fig. 9.

Figure 6:
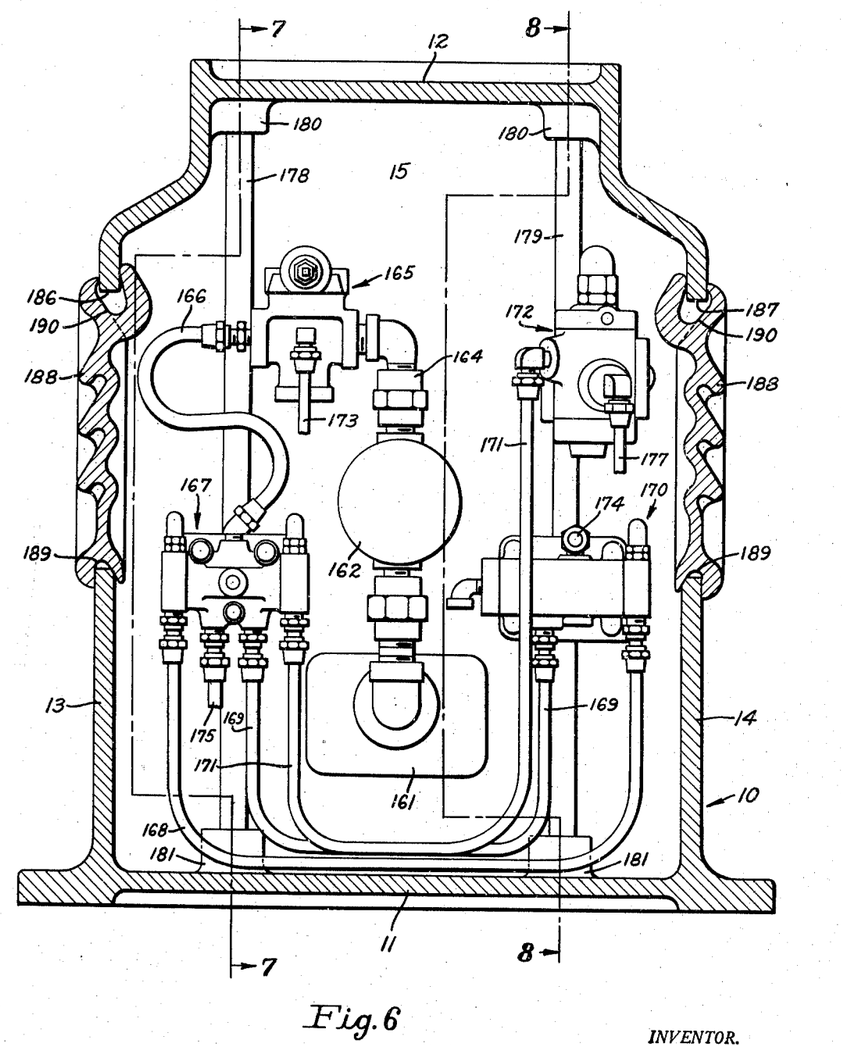
Fig. 6 is an enlarged sectional view taken as along the line 6—6 of Fig. 1 and showing certain piping and valve mechanism omitted from Fig. 1 for the purpose of obtaining greater clarity.
Figure 7:
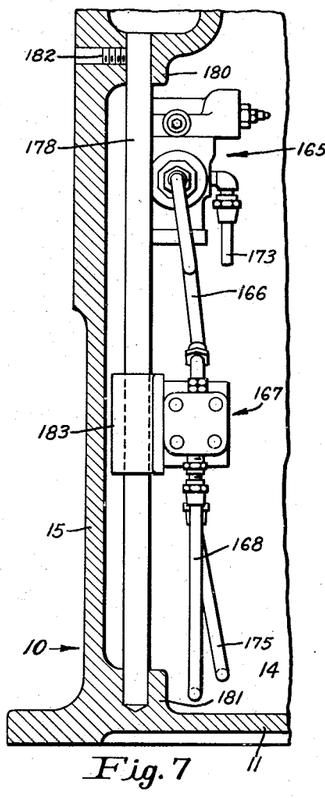
Fig. 7 is a sectional view taken as along the line 7—7 of Fig. 6.
Figure 8:
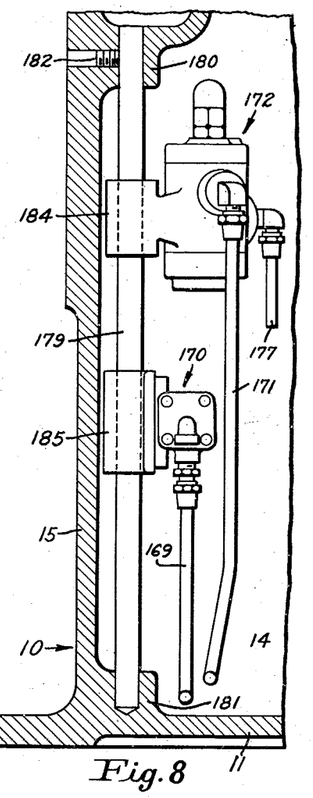
Fig. 8 is a sectional view taken as along the line 8—8 of Fig. 6.

Here, with particular relation to Figs. 6, 7, and 8, a means has been illustrated for convenient mounting of certain of the valves. Thus in these figures adjacent to the back wall 15 a pair of rods 178 and 179 are mounted vertically in the base 10 and each rod at its upper end is received in a boss 180 and its lower end in a boss 181 and these bosses may be cast with the base. Screws 182 may be set against the upper portions of the rods 178 and 179 to lock them in place. These rods are shown as receiving brackets 183, 184 and 185 carrying or mounting the valves 167, 172 and 170 respectively.

With this construction it is not necessary to cast pads on the inner side of the base casting and to machine such pads for the mounting of the valves. The rods 178 and 179 provide for the mounting of the valves with little expense and in addition the brackets may be adjusted vertically on the rods to easily move the valves or position the valves in the desired vertical relationship. In addition the valves may be swung about the rods within the limits permitted by the closeness of the rods to the wall 15 so that various parts may be cleared from one another.

The side walls 13 and 14 of the base casting are provided with openings 186 and 187 and in each of which opening is a casting 188. As shown, these castings are shaped to give the impression of louvers, also they are in fact solid to prevent oil or other hydraulic fluid being squirted out. The openings 186 and 187 also give access to the interior of the base casting for the making of adjustments or repairs of the valves or pipe fittings or the like. Louvers 188 are each notched at their lower end as at 189 to receive the lower edges of the respective wall openings 186 and 187 and at their upper ends are provided with deeper notches 190.

With the structure shown it will be seen that by inserting the fingertips under one of the louver-like formations on the plates 188 they may be lifted vertically telescoping their upper notches 190 over the upper edge walls about the openings 186 and 187 so as to lift their notches 189 above the lower edges of such openings whereupon the plates may be swung outwardly, lowered and removed.

To reinsert the plates or to position them their upper notches are disposed to receive the wall edges at the upper sides of the openings 186 and 187 and the plates are raised to have their lower edges clear the wall edges at the lower sides of such openings, then the lower edges of the plates are swung inwardly and dropped into position with their notches receiving portions of the walls 13 and 14 as in Fig. 6. With this construction it will be seen that the plates or louvers are easily and quickly removed and replaced and that they may add appreciably to the appearance of the machine and that they are positioned without using fastening means or hinges.

Figure 9:
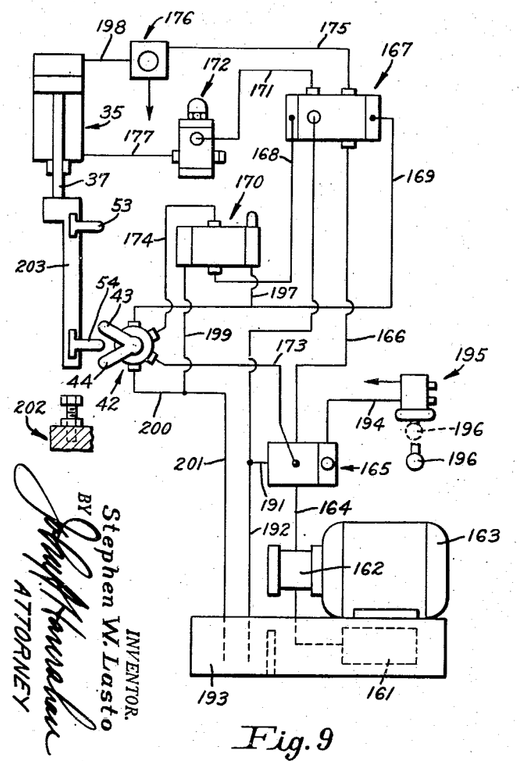
Fig. 9 is a diagram showing the piping arrangement to the various valves.
Figure 10:
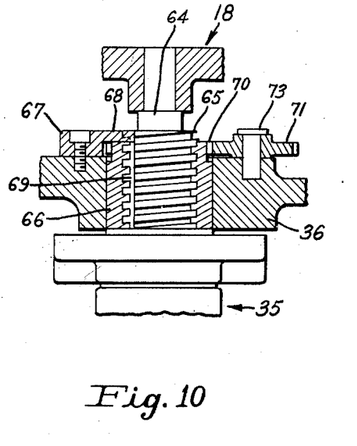
Fig. 10 is a detailed sectional view through an adjustable stop, the view being taken as along the line 10—10 of Fig. 4.
Figure 11:
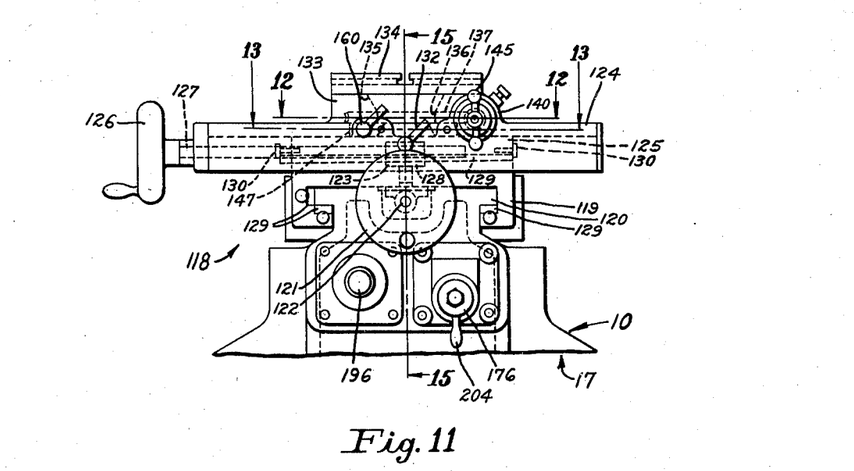
Fig. 11 is a front elevational view showing the work support portions of the machine.
Figure 12:
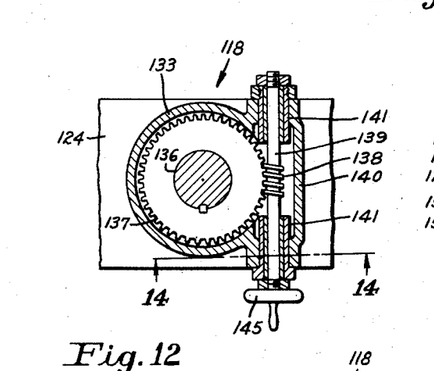
Fig. 12 is a sectional view taken as along the line 12—12 of Fig. 11.
Figure 13:
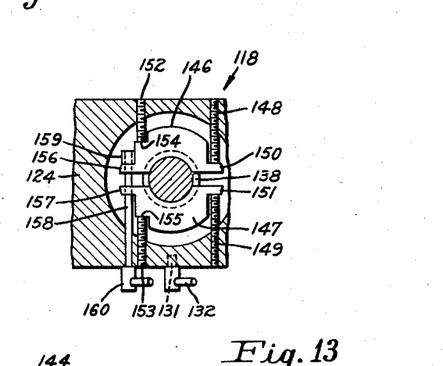
Fig. 13 is a detailed sectional view as along the line 13—13 of Fig. 11.
Figure 14:
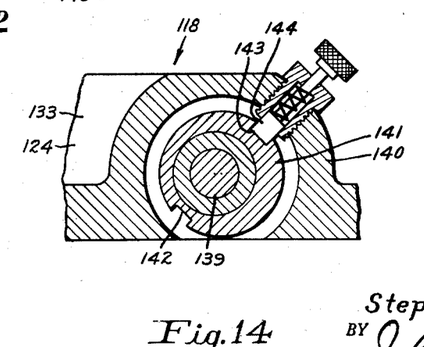
Fig. 14 is an enlarged detailed sectional view showing a lock means employed in connection with adjustment of the work holder.
Figure 15:
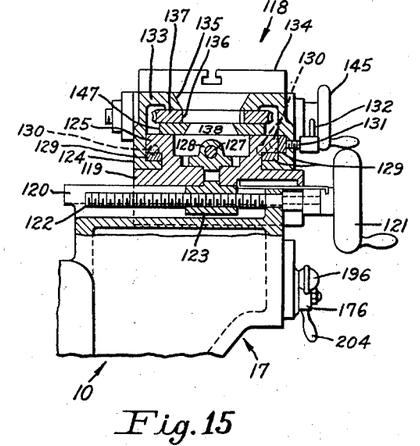
Fig. 15 is a central sectional view through the work holder, the view being taken as along the line 15—15 of Fig. 11.
Figure 16:
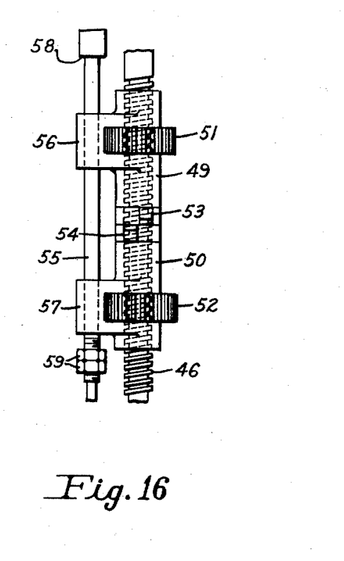
Fig. 16 is a detailed elevational view of valve trip means employed.
Figure 17:
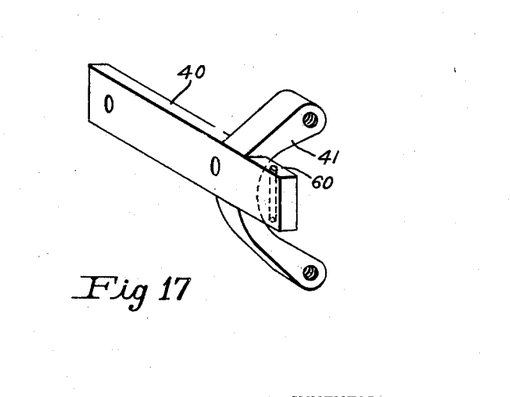
Fig. 17 is an isometric view of the rotary pilot valve mounting bracket.

Referring specifically to diagrammatic Fig. 9 it shows an actual piping arrangement wherein the pressure relief valve 165 has a by-pass connection 191 with a return line 192 extending from the four-way pilot operated valve 167 to a return tank 193 which latter is shown only in the diagram and which actually comprises the lower portion of the base. Additionally a line 194 connects the pressure relief valve 165 with a pilot valve 195. Valve 195 is actually an emergency stop and run valve and when its knob 196 is in the full line position the machine will operate and when its knob is pushed inwardly to the dotted line position the machine is stopped. When the knob is in the last named position the pressure relief valve 165 is overbalanced and all fluid delivered to the relief valve through line 164 is passed out through branch 191 to return 192.

Figure 22:
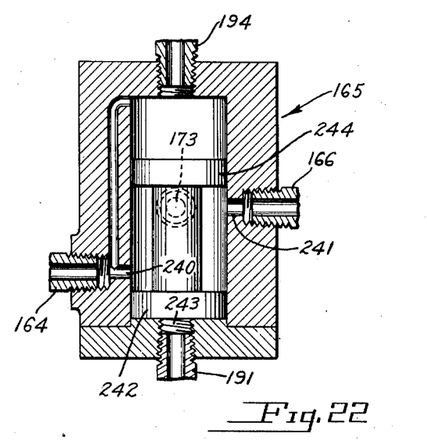
Fig. 22 is a similar view of a pressure relief valve employed.

This will be better understood with reference to Fig. 22. There valve 165 is shown in section, in position as when the machine is operating. At this time, fluid under pressure from the pipe 164 enters port 240 and passing through the open valve exits through port 241 to the pipe 166. The valve piston 242 now closes the exhaust port 243 to the return pipe 191. When the machine is to be stopped, the valve 195 is operated, opening the bleed through pipe 194 exhausting pressure from the upper side of piston 244. Now the piston valve assembly shifts upwardly by the pressure of the passing fluid whereby piston 242 closes communication between ports 240 and 241 and opens communication between port 240 and exhaust port 243 whereby all fluid is by-passed back to the pump.

Line 169 between the rotary pilot valve 42 and the four-way valve 167 is actually connected with the adjustable time delay valve 170 by branch 197. A line 198 connects the flow control and check valve 176 with the upper end of the cylinder 35. From the adjustable time delay valve 170 and the rotary pilot valve 42 drain lines 199 and 200 respectively connect with a return line 201. At 202 is illustrated an adjustable stop located in the path of movement of the means 203 symbolic of the dogs 49 and 50 and carrying the foot pieces 53 and 54.

The stop and run pilot valve 195 is mounted at the front of the base extension 17 along with the flow control and check valve 176 which actually is a speed control valve and is adjustable through manipulation of a handle 204. On one side of the base extension 17 is a panel or box 205 mounting control switches having manuals 206, 207 and 208. Two of these switches may be direct controls for the motors 21 and 163 respectively and the other controls the rate of revolution of motor 21. As the tank 193 is the lower portion of the casting it will be appreciated that various return lines may be omitted and the returning fluid merely dropped into the well of the machine.

Figure 20:
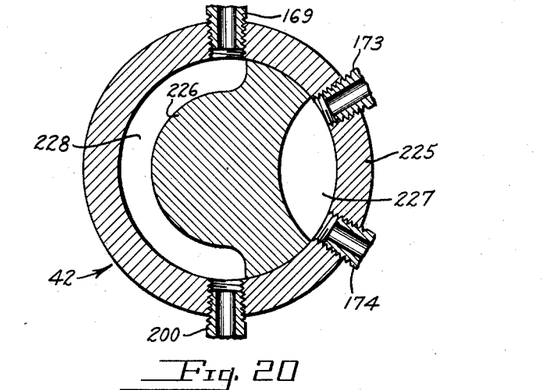
Fig. 20 is a schematic sectional view showing the interior of a reversing valve employed.

The reversing valve 42 is shown more in detail in Fig. 20 and there it will be noted the valve includes a casing 225 having four ports to which the pipe lines 169, 173, 174 and 200 are connected. Within said casing is the valve body 226 oscillatable through an arc of approximately forty-five degrees as the lugs 43 and 44 are alternately engaged by the dogs 53 and 54 during the machine's operation.

Figure 21:
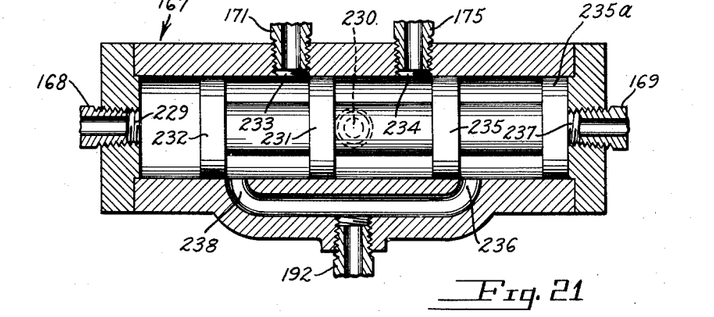
Fig. 21 is a similar view of a four-way type of pilot operated valve employed.

As shown in Fig. 20, fluid under pressure from the pump 162 enters the valve 42 from the pipe or line 173 and exits through the pipe or line 174. Within the valve casing 225, the connection is made through the passage 227 in the valve body 226. At this time, a passage 228 in the valve body places the pipe or line 169 in communication with the exhaust pipe or line 200. Therefore, with the valve body 226 positioned as in Fig. 20, fluid under pressure is fed through 174 to valve 170 and thence through pipe 168 to a port 229 of valve 167 and the spool or piston of valve 167 is to the right as in Fig. 21. This is true since the reversing valve 42 is supplying fluid under pressure to pipe 168 and port 229 and is exhausting fluid from the valve 167 through port 237 and pipe 169.

Under such circumstances, fluid under pressure from the pump, entering spool valve 167 through port 230 from the pipe 166 and passing between the spools or pistons 231 and 235, exits through port 234 to a pipe 175 which, through a valve 176 and a pipe 198, delivers such fluid to the upper end of the cylinder 35. At this time, fluid from the lower end of such cylinder moves through a pipe 177, a valve 172 and a pipe 171 to the port 233 (Fig. 21) and passing between the spools or pistons 231 and 232 of said valve 176 exhausts through port 238 to the exhaust or return line 192.

In the diagram of Fig. 9, the reversing valve 42 has just been operated at the top of the machine's stroke. Under these circumstances, passage 227 of valve body 226 has been shifted to place the inlet from pipe 173 in communication with the outlet to pipe 169 so fluid under pressure is now supplied to port 237 of valve 167 from or through the pipe or line 169 and the entire spool or piston construction of valve 167 is to the left from the position shown in Fig. 21. At this time, while fluid under pressure is supplied to port 237 it is exhausted from port 229 since now passage 228 in valve body 226 is placing pipe 168, through valve 170 and pipe 174, in communication with exhaust or return pipe 200.

The described movement of the spool or piston construction of valve 167 places pressure inlet port 230 of that valve in communication with the port 233 and thus pipe 171, valve 172 and pipe 177 whereby fluid under pressure is fed to the lower end of cylinder 35 to move the platen of the machine upwardly. Now, fluid may exhaust from the upper end of cylinder 35 through pipe 198, valve 176, pipe 175 and through port 234 of valve 167 between spools or pistons 235 and 235a to an exhaust port 236 and thence to the return or exhaust pipe 192.

Assuming the machine to be in operation the pressure line 166 from the pressure relief valve 165 to the four-way valve 167 serves to provide means to balance the piston valves of the latter. As shown in Fig. 9 fluid under pressure from valve 165 is passing through pipe 173 to the rotary pilot valve 42 and from the latter through pipe 169 to the four-way valve 167 and from thence through pipe 175 to the flow control and check valve 176 and from there through pipe 198 to the upper portion of the cylinder.

As the piston is moved downwardly the posts 24 and 25 are similarly moved and carry the screw 46 and the dogs 49 and 50 with them. At the bottom of the stroke valve 42 is reversed and stop post or pin 64 rests against it limiting screw 65. When the valve 42 is reversed the flow through line 169 is cut off and the flow is then from valve 42 through line 174 to the adjustable time control valve 170. Valve 170 has previously been set to give the desired delay or pause at the bottom of the stroke and at the end of this pause the pressure is through line 168 from valve 170 to valve 167 and from the latter through pipe 171 to the counter-balance valve 172 and from the latter through pipe 177 to the lower end of cylinder 35.

Now the return stroke is imparted to the piston within cylinder 35 and the dogs 49 and 50 are carried upwardly and at the end of the upper stroke valve 42 is again reversed. The area of the piston engaged by the fluid under pressure during the upstroke of the piston is only one half the area engaged by the fluid under pressure on the downstroke of the piston. Therefore the piston is carried upwardly twice as fast as it is carried downwardly.

The working stroke of the present machine is the downstroke and thus we have a slow steady work stroke and a rapid return. Valve 176 is a flow control valve permitting rapid exhaust from the upper side of the piston during the return stroke of the latter but permitting only a predetermined return of feed or volume of feed to the upper portion of the cylinder on the downstroke. Counter-balance valve 172 prevents a descent of the piston in cylinder 35 on removal of pressure from the system by the moving of valve 195 to stop the machine.

Thus on operation of the valve 195 to stop position valve 172 acts as a check to retain the fluid in the lower portion of the cylinder 35 so that all parts of the machine may be stopped and held at any point in their downward movement. The adjustable time control valve must be open to pressure momentarily between the delay periods and during this time oil or other fluid under pressure is discharged through the line 199. The branch 197 from line 169 provides means subjecting the adjusted time control valve 170 to pressure at the start of each downstroke of the machine and this is between the delay periods since they are at the end of the downstroke and before the start of the upstroke.

Figure 19:
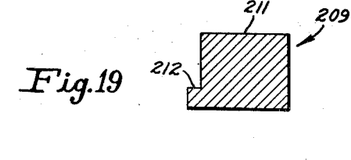
Fig. 19 is a sectional view of said piece of work as along the line 19—19 of Fig. 18.

It will now be understood that when the machine is placed in operation the hydraulic means through the various controls described serve to continuously raise and lower the posts 24 and 25 and thereby the platen 18 together with the motor 21. The motor while thus being reciprocated vertically has its shaft disposed horizontally for direct driving connection with a tool. The tool may be used for roughing out a punch or for other work and in Figs. 18 and 19 a block of metal is shown at 209 and the same is marked or inscribed with a line 210 showing the shape of the desired punch.

The block will be secured to the work plate 134 and the latter adjusted so that as the tool comes down it engages the work. It has a stroke equal to the distance between the top 211 of the block 209 and a point 212 which point is located below the top a distance slightly less than will be the height of the finished punch element. Block 209 is turned and adjusted while the tool is being moved up and down and gradually the metal of the block will be removed to a point close to the inscribed line 210 leaving only enough for cleaning up and finishing of the punch. This is also true with regard to the surface 210 of the base. All cutting action takes place during the down stroke of the machine and the delay or pause at the bottom of the stroke provides times for the tool to clean up the lower end of the work.

The return and downward feed is adjusted by the valve 176 controlling the escape from the upper end of the cylinder 35 although the feature of the valve is that in spite of the fact that it permits a free movement of the fluid from the cylinder so that the upstroke of the machine may be fast it provides only for a slow feed for the fluid under pressure to the upper end of the cylinder so that the machine has a controlled downstroke. The slow working stroke and fast return is also assisted by the fact that the cylinder and piston construction is such that the volume of fluid at the lower side of the piston is only one half of that of the upper side thereof.

A feature of the machine is that adjustments of the length of the stroke may be easily made from the outside of the machine by manipulation of the knobs 75 and 95. As previously pointed out in considerable detail the adjustment of the knob 75 to regulate the length of the downstroke simultaneously affects adjustment of the stop screw 65. Adjustments affected by the knobs 75 and 95 for controlling the length of the down and up strokes may be affected not only from the outside of the machine but also while the machine is actually operating.

The delay at the end of the working stroke permits the cutters to clear themselves before the beginning of the upstroke and compensates for any deflection of the cutters. Simultaneous adjustment of the dog 49 and control of the length of the downstroke with adjustment of the stop screw 65 is particularly desirable because if the pin 64 should engage screw 65 before the rotary pilot valve is tripped the machine would never start its upstroke. The tie-rod 55 and its limiting devices prevent adjustments of the dogs 49 and 50 up and downwardly respectively to such an extent as to disengage the gears 51 and 52 from the wide gears 93 and 114. Stop rods 61 and 62 prevent adjustments of the dogs inwardly or toward one another to any such extent as would unmesh such gears.

Additionally the rod 55 and associated parts together with rods 61 and 62 prevent a series of adjustments from working the gears out of mesh. For example, if gear 51 could be worked down to a position barely meshing with gear 93 then the tie-rod 53 would be in a lower position and permit a further downward adjustment of the gear 52 taking it completely out of mesh with the gear 114. However, rod 61 prevents this. A similar upward adjustment such as might enable gear 52 or 51 being adjusted each in a similar increment to unmesh one or the other from the companion gear is prevented by the rod 62.

Having thus set forth the nature of my invention, what I claim is:

1. In a machine of the class described, a platen, a motor on said platen, means for reciprocating said platen and thereby said motor, said means comprising a pair of parallel posts fixed to said platen and mounted for guided reciprocable movements, a hydraulic piston and cylinder construction, means mounting the cylinder of said construction in a fixed position, means connecting the piston of such construction to said posts to impart reciprocable movements to the latter as the piston is moved in the cylinder, means for supplying fluid under pressure alternately to the opposite ends of said cylinder, said last means including a pilot valve mounted in fixed position on said cylinder, and a pair of dogs movable with said posts and adapted to alternatively engage and reverse said valve at the ends of the respective movements of the dogs with said posts.

2. In a machine of the class described, a platen, a motor on said platen, means for reciprocating said platen and thereby said motor, said means comprising a pair of parallel posts fixed to said platen and mounted for guided reciprocable movements, a hydraulic piston and cylinder construction, means mounting the cylinder of said construction in a fixed position, means connecting the piston of such construction to said posts to impart reciprocable movements to the latter as the piston is move in the cylinder, means for supplying fluid under pressure alternately to the opposite ends of said cylinder, said last means including a pilot valve and means mounting it in a fixed position, and a pair of dogs movable in unison with said posts and platen and located to alternately engage and reverse said valve at the ends of the respective movements of the dogs with the posts and platen.

3. In a machine of the class described, a platen, a motor on said platen, means for reciprocating said platen and thereby said motor, said means comprising a pair of parallel posts fixed to said platen and mounted for guided reciprocable movements, a hydraulic piston and cylinder construction, means mounting the cylinder of said construction in a fixed position, means connecting the piston of such construction to said posts to impart reciprocable movements to the latter as the piston is moved in the cylinder, means for supplying fluid under pressure alternately to the opposite ends of said cylinder, said last means including a pilot valve and means mounting it in fixed position, a dog movable with said posts and adapted on movement in one direction to engage and reverse said valve, a second dog movable with said posts and adapted on movement in the opposite direction to engage and reverse said valve, and manually operable means for adjusting the first mentioned dog relative to the posts and the second mentioned dog.

4. In a machine of the class described, a platen, a motor on said platen, means for reciprocating said platen and thereby said motor, said means comprising a pair of parallel posts fixed to said platen and mounted for guided reciprocable movements, a hydraulic piston and cylinder construction, means mounting the cylinder of said construction in a fixed position, means connecting the piston of such construction to said posts to impart reciprocable movements to the latter as the piston is moved in the cylinder, means for supplying fluid under pressure alternately to the opposite ends of said cylinder, said last means including a pilot valve and means mounting it in fixed position, a dog movable with said posts and adapted on movement in one direction to engage and reverse said valve, a second dog movable with said posts and adapted on movement in the opposite direction to engage and reverse said valve, and manually operable means for adjusting the second mentioned dog relative to the posts and the first mentioned dog.

5. In a machine of the class described, a platen, a motor on said platen, means for reciprocating said platen and thereby said motor, said means comprising a pair of parallel posts fixed to said platen and mounted for guided reciprocable movements, a hydraulic piston and cylinder construction, means mounting the cylinder of said construction in a fixed position, means connecting the piston of such construction to said posts to impart reciprocable movements to the latter as the piston is moved in the cylinder, means for supplying fluid under pressure alternately to the opposite ends of said cylinder, said last means including a pilot valve and means mounting it in fixed position, a dog movable with said posts and adapted on movement in one direction to engage and reverse said valve, a second dog movable with said posts and adapted on movement in the opposite direction to engage and reverse said valve, a base enclosing said post, valve and dogs, and means manually operable from the exterior of said base for adjusting said dogs relative to one another and to said posts.

6. In a machine of the class described, a base, a platen at one side of said base, a motor on said platen, said base including a top wall, a pair of parallel posts located for the most part in said base and fixed at corresponding ends to said platen, means for reciprocating said posts and thus said platen and motor, said last means including a piston and cylinder construction, means mounting said cylinder in a fixed position, means connecting said piston with said posts to impart reciprocable movements to the latter as the piston is moved in the cylinder, means for supplying fluid under pressure alternately to opposite ends of the cylinder, said last means including a pilot valve mounted in a fixed position, a dog movable with said posts and adapted on movement in one direction to engage and reverse said valve, a second dog movable with said posts and adapted on movement in the opposite direction to engage and reverse said valve, said valve and dogs located within said base, manual means operable from the exterior of said base for individually adjusting said dogs relative to said posts and to one another.

7. In a machine of the class described, a base, a platen at one side of said base, a motor on said platen, said base including a top wall, a pair of parallel posts located for the most part in said base and fixed at their corresponding ends to said platen, means for reciprocating said posts and thus said platen and motor, said last means including a piston and cylinder construction, means mounting said cylinder in a fixed position, means connecting said piston with said posts to impart reciprocable movements to the latter as the piston is moved in the cylinder, means for supplying fluid under pressure alternately to opposite ends of the cylinder, said last means including a pilot valve mounted in a fixed position, a dog movable with said posts and adapted on movement in one direction to engage and reverse said valve, a second dog movable with said posts and adapted on movement in the opposite direction to engage and reverse said valve, said valve and dogs located within said base, manual means operable from the exterior of said base for individually adjusting said dogs relative to said posts and to one another, an adjustable stop means on one wall of said base in the path of movement of said platen, means on the platen to engage said stop means on the limit of movement of the platen towards said stop means, and means whereby the manual means for adjusting the first mentioned dog simultaneously adjusts the position of said stop means whereby the stop means and first mentioned dog always are in the same relation.

8. The combination as in claim 6 wherein said manual means includes a knob, a vernier plate associated with said knob, and means whereby a large increment of movement of said knob results in but a small turning movement of said vernier plate.

9. The combination as in claim 7 wherein said manual means includes a knob, a vernier plate associated with said knob, and means whereby a large increment of movement of said knob results in only a small movement of said plate.

10. The combination as in claim 6 wherein said dogs are mounted on a fixed screw, a gear associated with each of said dogs and threaded onto said screw, and said manual means including means for rotating said gears and threading them along said screw to adjust said dogs longitudinally thereof.

11. The combination as in claim 7 wherein said dogs are mounted on a fixed screw, a gear associated with each of said dogs and threaded onto said screw, and said manual means including means for rotating said gears and threading them along said screw to adjust said dogs longitudinally thereof.

12. The combination as in claim 6 including a gear movable with each of said dogs and rotatable relative to them, said manual means including wide gears meshing with the gears of the respective dogs to stay in mesh with the latter when they are adjusted with the dogs, a fixed screw, said dogs slidable on said screw, said gears movable with the dogs threaded to said screw, hand knobs, and means whereby on turning of said hand knobs said wide gears are turned.

13. The combination as in claim 7 including a gear movable with each of said dogs and rotatable relative to them, said manual means including wide gears meshing with the gears of the respective dogs to stay in mesh with the latter when they are adjusted with the dogs, a fixed screw, said dogs slidable on said screw, said gears movable with the dogs threaded to said screw, hand knobs, and means whereby on turning of said hand knobs said wide gears are turned.

14. In a machine of the class described, a motor and a tool supported and rotated by the shaft of the motor about a horizontal axis, means for continuously reciprocating said motor and thereby said tool vertically, said means comprising a hydraulic cylinder and piston construction of which one of said piston and cylinder is vertically movable to move said motor and tool, means for supplying fluid under pressure alternately to the opposite ends of said cylinder of said construction, said last means including a pilot valve mounted in fixed position, a pair of dogs movable with the movable part of said piston and cylinder construction and adapted to alternately engage and reverse said valve at the ends of the respective movements of the dogs, and means manually operable by hand pieces remote from said dogs for independently adjusting them toward and from one another to vary the lengths of the strokes of said reciprocating movement.

15. In a machine of the class described, a base, a motor in the upper side of said base, a tool supported by the shaft of said motor and by the latter rotatable about a horizontal axis, means for continually vertically reciprocating said motor and tool, said means including a piston and cylinder construction of which one of said piston and cylinder is vertically movable, means for applying fluid under pressure alternately to opposite ends of a cylinder, said latter means including a fixed pilot means, a dog movable vertically with the movable one of said piston and cylinder construction and adapted on downward movement to engage and reverse said valve, a second dog movable vertically with the movable one of said piston and cylinder construction and adapted on upward movement to engage and reverse said valve, manual means operable for individually adjusting said dogs vertically relative to one another and to the movable one of said piston and cylinder construction, a vertically adjustable stop means at the upper end of said base and below said motor, means movable with said motor to engage said stop means on the limit of downward movement of the motor and tool, and means whereby the manual means for adjusting the first mentioned dog simultaneously adjusts the position of said stop means whereby the stop means and first mentioned dog always are in the same relation.

16. In a machine of the class described, a base, a platen, an electric motor mounted on said platen, hydraulic means for reciprocating said platen and the motor thereon relative to said base, adjustable means to vary the stroke imparted in one direction to said platen by said hydraulic means, a mechanical stop on said base to positively limit such stroke of the platen by said hydraulic means, said mechanical stop adjustable, and a single manually operable instrumentality for simultaneously adjusting said adjustable means and said mechanical stop to maintain them in predetermined relation.

STEPHEN W. LASTO.

REFERENCES CITED

The following references are of record in the file of this patent:

UNITED STATES PATENTS

| Number | Name | Date |
| --- | --- | --- |
| 1,126,212 | Hendee | Jan. 26, 1915 |
| 1,942,414 | Dumser et al. | Jan. 9, 1934 |
| 1,978,346 | Ernst et al. | Oct. 23, 1934 |
| 2,007,827 | Fletcher | July 9, 1935 |
| 2,027,726 | Fletcher | Jan. 14, 1936 |
| 2,036,293 | Nenninger et al. | Apr. 7, 1936 |
| 2,161,268 | Zimmermann | June 6, 1939 |
| 2,235,444 | Wohlfarth et al. | Mar. 18, 1941 |
| 2,257,849 | Martellotti | Oct. 7, 1941 |
| 2,360,772 | Hedin | Oct. 17, 1944 |
| 2,364,478 | Schreiber | Dec. 5, 1944 |